P. S. BAEDER.
WAGON SEAT.
APPLICATION FILED JUNE 12, 1918.
1,284,040.
Patented Nov. 5, 1918.
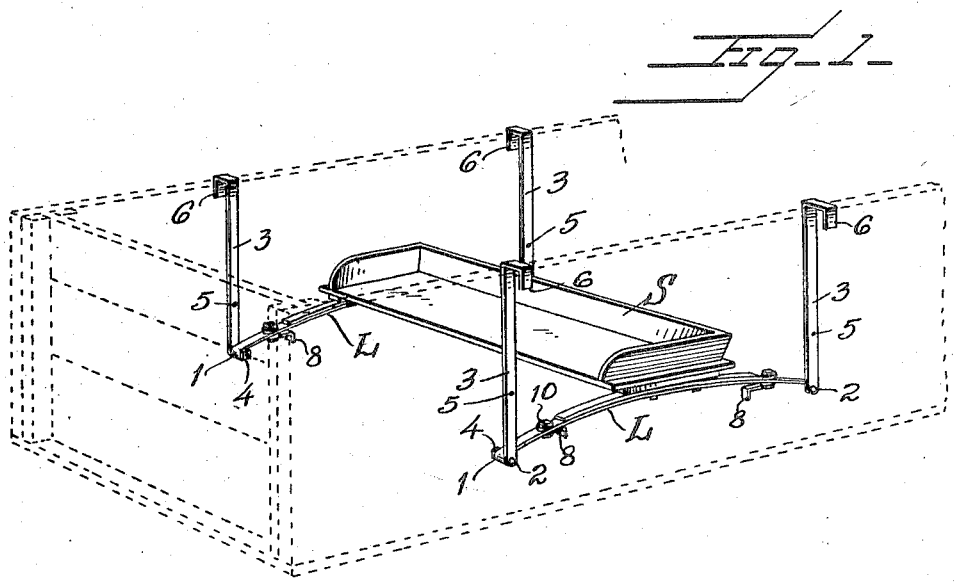
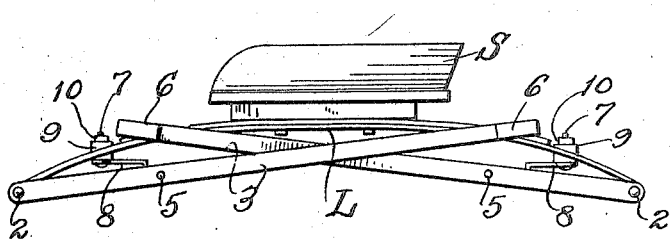
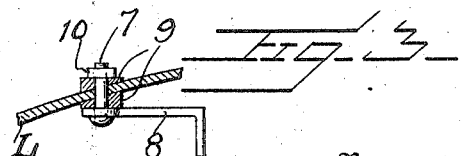
Inventor
Paul S. Baeder
By Watson E. Coleman
Attorney

UNITED STATES PATENT OFFICE.

PAUL S. BAEDER, OF NEW ROCKFORD, NORTH DAKOTA.

WAGON-SEAT.

1,284,040.   Specification of Letters Patent.   Patented Nov. 5, 1918.

Substitute for application Serial No. 221,526, filed March 9, 1918. This application filed June 12, 1918. Serial No. 239,591.

*To all whom it may concern:*

Be it known that I, PAUL S. BAEDER, a citizen of the United States, residing at New Rockford, in the county of Eddy and State of North Dakota, have invented certain new and useful Improvements in Wagon-Seats, of which the following is a specification, reference being had to the accompanying drawings.

This invention relates to certain improvements in wagon seats and has relation more particularly to a device of this general character especially designed and adapted for use in connection with wagon boxes and it is an object of the invention to provide a device of this general character with novel and improved means whereby the seat element may be supported with convenience and facility from the side boards of a wagon box or may be readily positioned upon the load within the box when the occasion of practice may so require.

Another object of the invention is to provide a novel and improved device of this general character including a pair of hangers coacting with each end portion of the seat element and which hangers are adapted to be detachably engaged with the sides of a wagon box and wherein the seat element is directly secured to resilient members engaged with the lower portions of the hangers.

A still further object of the invention is to provide a novel and improved device of this general character including a pair of hangers coacting with the opposite end portions of a seat element together with means whereby the seat element may be readily adjusted longitudinally of the hangers.

The invention consists in the details of construction and in the combination and arrangement of the several parts of my improved wagon seat whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in perspective illustrating a wagon seat constructed in accordance with an embodiment of my invention in applied position, the coacting portion of the wagon body being indicated by dotted lines;

Fig. 2 is a view in end elevation of my improved wagon seat as herein embodied in compacted form; and Fig. 3 is an enlarged fragmentary view partly in section and partly in elevation illustrating the mounting of one of the hook members as herein employed.

As disclosed in the accompanying drawings my improved wagon seat comprises the seat element S having its opposite end portions resting upon and suitably secured to the leaf springs L extending a predetermined distance beyond the opposite sides of the element S. The opposite ends of the springs L are provided with the barrels 1 through each of which is directed a removable bolt 2 and which bolt 2 is also removably directed through an end portion of a hanger 3. Coacting with the shank of the bolt 2 and inwardly of the spring L is a clamping or holding nut 4. Each of the hangers 3 is provided with a plurality of longitudinally spaced openings 5 so that the element S may be positioned at different points along the hanger 3 as the occasions of practice may necessitate. It will be self-evident that the changing of the position of the seat relative to the hanger may be easily obtained in view of the fact that the bolt 2 is readily removed and applied.

The upper or free end portions of the hangers 3 are provided with the outwardly disposed and downwardly or inwardly facing hook members 6 which are adapted to straddle the upper marginal portions of the sides of the wagon box for supporting the seat in applied position and for arranging the element S within the box so that the front of the wagon box will serve to protect the occupants of the element S from the elements and especially when the temperature is low.

The hangers 3 possess a certain degree of inherent resiliency so that the pair of hangers adjacent each end of the element S may be readily sprung to pass one another when the hangers are swung inwardly and downwardly to compact the structure when it is desired to position my improved seat on the top of the load within the wagon box. As is clearly indicated in Fig. 2 of the accompanying drawings, it will be understood that when my improved seat is positioned upon the top of the load or other surface, the seat element S will still be yieldingly supported by the springs L so that the occupant of the seat will be materially relieved of the shocks and jars incident to travel. It will also be understood that the bolts 2 serve as pivots to permit the required swinging movement of the hangers 3.

Each of the springs L at opposite sides of the seat element S has pivotally engaged therewith through the medium of the bolt 7 the hook members 8 which are adapted to be swung outwardly and laterally relative to the spring L when the wagon is loaded and the hangers 3 are in their folded position. In other words, each of the hook members 8 moves about an axis substantially at right angles to the axis of the adjacent hanger 3. When extended outwardly the hook members 8 engage the upper marginal portions of the sides of the wagon box for supporting the seat in applied position when the wagon box is loaded. Normally, or when not in use, the hook members 8 are swung in a position to underlie the spring L so that the same are substantially entirely concealed and which is of particular advantage when the hangers 3 are operatively engaged with the sides of the wagon box.

Each of the bolts 7 has coacting therewith the washers 9 arranged at opposite sides of the spring L and which are of a wedge formation so that the outer face of said washers may be arranged in planes to have efficient coaction with the head of the bolt 7 and the nut 10 coacting therewith.

The present application is filed as a substitute and partly in continuation of my application for Letters Patent filed March 9, 1918, Serial No. 221526.

From the foregoing description, it is thought to be obvious that a wagon seat constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A wagon seat comprising a seat element, leaf springs secured to said element at opposite ends thereof and extending beyond the opposite sides of the element, and hook members pivotally engaged with the springs, said hook members being movable outwardly and laterally relative to the springs.

In testimony whereof I hereunto affix my signature.

PAUL S. BAEDER.

Copies of this patent may be obtained for five cents each, by addressing the "Commissioner of Patents, Washington, D. C."